United States Patent
Luft et al.

(10) Patent No.: US 8,010,144 B2
(45) Date of Patent: Aug. 30, 2011

(54) COMPUTER-AIDED CONFERENCE SESSION HAVING PRIORITY INDICATION

(75) Inventors: Achim Luft, Braunschweig (DE); Martin Hans, Bad Salzdetfurth (DE); Norbert Schwagmann, Braunschweig (DE); Andreas Schmidt, Braunschweig (DE)

(73) Assignee: Infineon Technologies AG (DE)

( * ) Notice: Subject to any disclaimer, the term of this patent is extended or adjusted under 35 U.S.C. 154(b) by 959 days.

(21) Appl. No.: 11/465,484

(22) Filed: Aug. 18, 2006

(65) Prior Publication Data
US 2007/0049315 A1 Mar. 1, 2007

(30) Foreign Application Priority Data
Aug. 22, 2005 (DE) .......................... 10 2005 039 668

(51) Int. Cl.
*H04B 7/00* (2006.01)
(52) U.S. Cl. ........ 455/518; 455/519; 455/520; 370/340; 709/204; 709/205; 709/206
(58) Field of Classification Search .......... 455/517–520; 370/340; 709/204–206
See application file for complete search history.

(56) References Cited

U.S. PATENT DOCUMENTS

| 2004/0005904 A1* | 1/2004 | Wolf et al. .................. 455/519 |
| 2004/0156380 A1* | 8/2004 | Silverman et al. ............ 370/428 |
| 2005/0032539 A1 | 2/2005 | Noel et al. |

FOREIGN PATENT DOCUMENTS

| KR | 10-0477959 | 3/2005 |
| KR | 10-0513227 | 9/2005 |
| WO | WO-03/069944 A1 | 8/2003 |
| WO | WO-04/002071 A1 | 12/2003 |

OTHER PUBLICATIONS

Push-to-Talk over Cellular (PoC); Architecture; PoC—Release 1.0, Architecture V1.1.0; Aug. 2003, pp. 1-23.
J. Rosenberg et al., Network Working Group, Request for Comments: 3261, SIP: Session Initiation Protocol, Jun. 2002, pp. 1-236.
H. Schulzrinne et al., Network Working Group, Request for Comments: 3550, RTP: A Transport Protocol for Real-Time Applications, Jul. 2003, pp. 1-92.
J. Rosenberg, et al., "A Session Initiation Protocol (SIP) Event Package for Conference State," draft-ietf-sipping-conference-package-01, Jun. 2003, pp. 1-22.
J. Rosenberg, "A Framework for Conferencing with the Session Initiation Protocol," Internet Engineering Task Force, draft-ietf-sipping-conferencing-framework-00.txt, May 2003, pp. 1-37.

* cited by examiner

*Primary Examiner* — Fayyaz Alam
(74) *Attorney, Agent, or Firm* — Dickstein Shapiro LLP

(57) ABSTRACT

A priority indication, which is used to prescribe at least one priority with which a conference session to which the at least one participant communication terminal is to be invited is to be conducted, is added to a conference session invitation message.

28 Claims, 2 Drawing Sheets

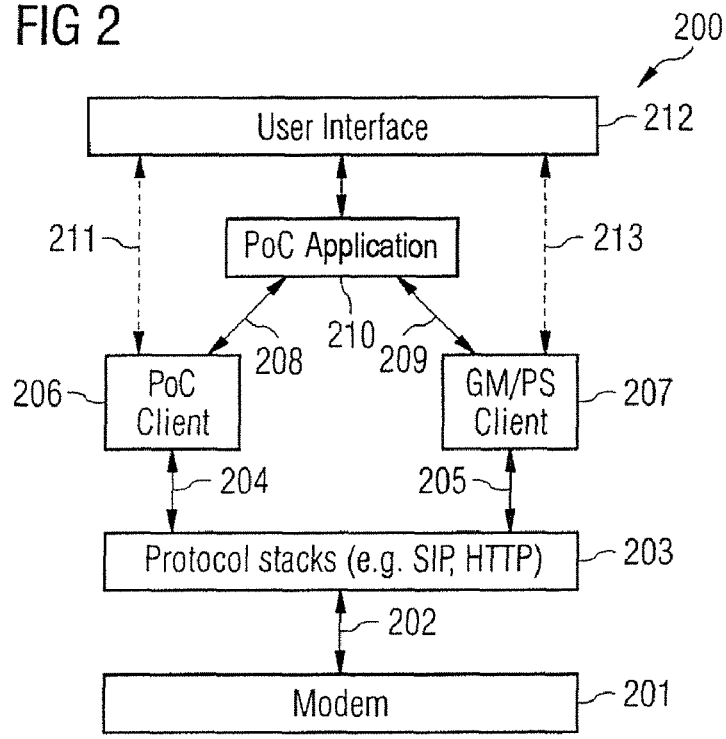
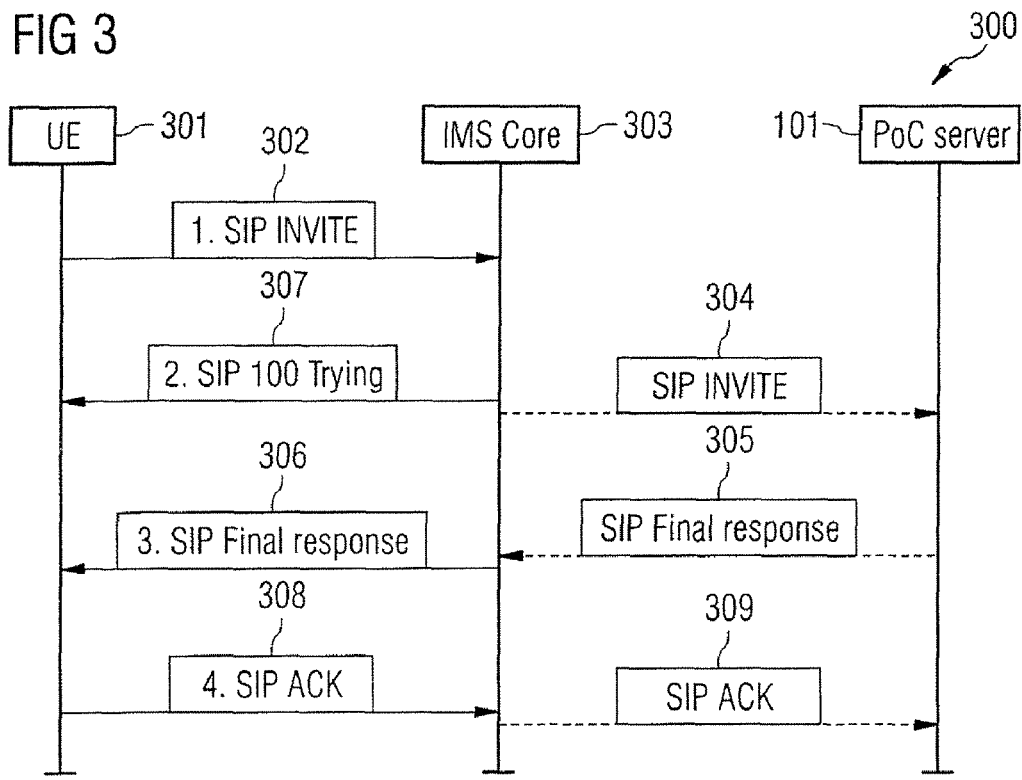

US 8,010,144 B2

COMPUTER-AIDED CONFERENCE SESSION HAVING PRIORITY INDICATION

CROSS-REFERENCE TO RELATED APPLICATION

This application claims priority to German Patent Application Serial No. 10 2005 039 668.2-31, which was filed on Aug. 22, 2005, and is incorporated herein by reference in its entirety.

TECHNICAL FIELD OF THE INVENTION

The invention relates to a method for the computer-aided formation of a conference session invitation message, to a method for the computer-aided generation of a conference session, to a method for the computer-aided processing of messages in a conference session, to a unit for generating a conference session invitation message, to a unit for generating a conference session, and to a communication terminal.

BACKGROUND OF THE INVENTION

In the case of push-to-talk over cellular, as is specified in the Open Mobile Alliance, participant communication terminals and their users may be simultaneously involved in a plurality of sessions. Since only one data stream can ever be output on the respective participant communication terminal at one time, provision is currently made for a user of a participant communication terminal who has been invited to a communication session to be able to determine during a communication session whether it is intended to be a high-priority communication session ("primary session") or a lower-priority communication session ("secondary session") for him.

BRIEF DESCRIPTION OF THE FIGURES

FIG. 2 shows a block diagram in which the communication protocol stack in accordance with push-to-talk over cellular is illustrated; and FIG. 3 shows a message flowchart in which the flow of messages according to one exemplary embodiment of the invention is illustrated.

DETAILED DESCRIPTION OF THE INVENTION

Figure 1:
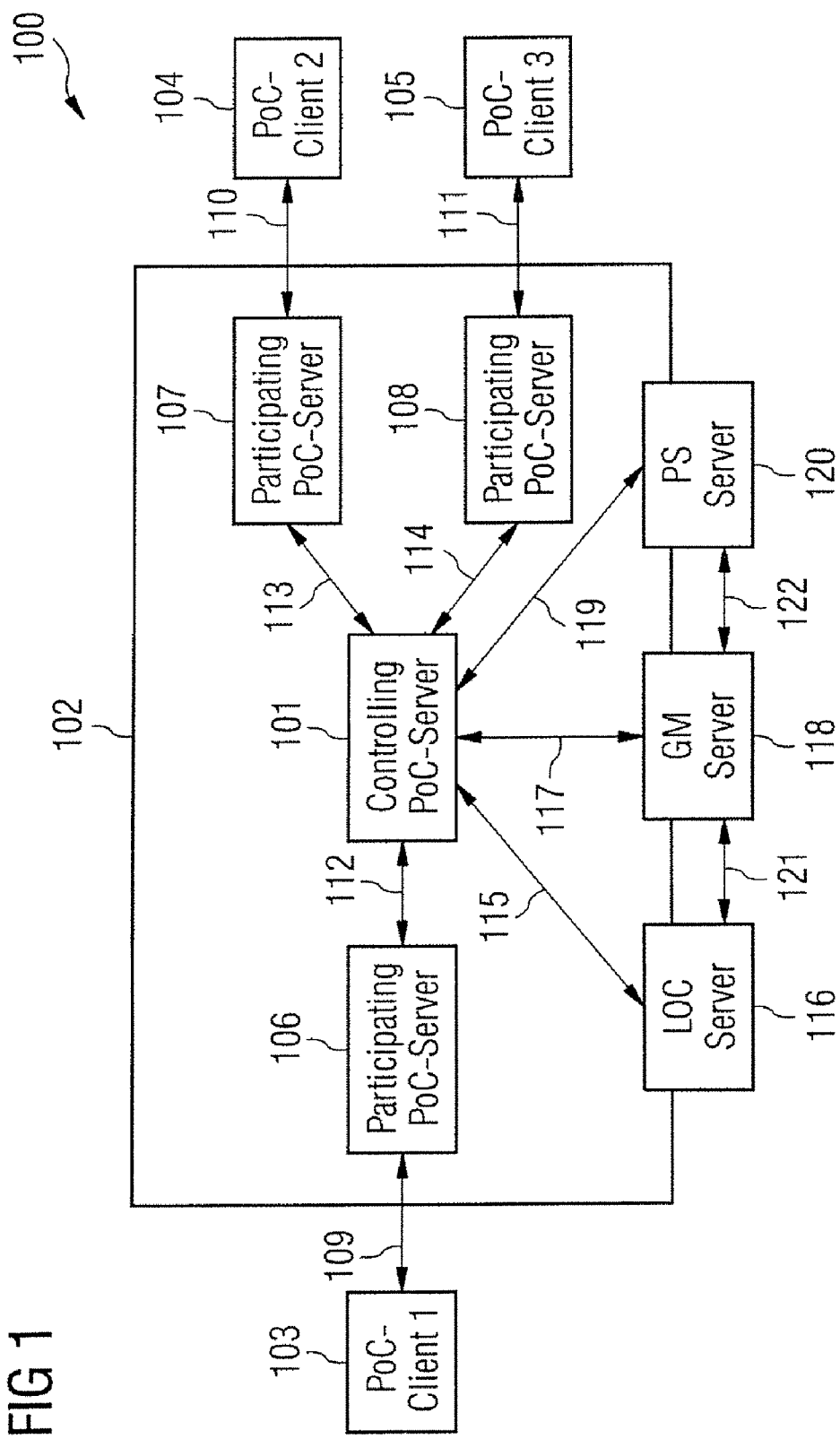
FIG. 1 shows a block diagram in which the architecture of a push-to-talk over cellular communication system according to one exemplary embodiment of the invention is illustrated.

Push-to-talk over cellular (PoC) is a communication service which has been offered by the company Nextel to its customers for several years in the USA under the name "Direct Connect". In Europe, the push-to-talk over cellular communication service is specified in an industrial consortium. Additional activities take place in the Open Mobile Alliance (OMA) and 3rd Generation Partnership Project (3GPP) standardization committees.

Push-to-talk over cellular is provided using a packet-switched communication network, the Internet Protocol (IP) being used as the network communication protocol in the push-to-talk over cellular architecture. A central PoC server which is also referred to as a controlling PoC server is provided for each push-to-talk over cellular communication session (also referred to as a PoC group session). During a PoC group session, the PoC clients have each set up a communication link to the controlling PoC server via a so-called participating PoC server which is allocated to them. The Internet Protocol Multimedia Subsystem (IMS) which uses the so-called Session Initiation Protocol (SIP) as the signaling communication protocol is used, for example, for the signaling communication link between the PoC client and the participating PoC server and between the respective participating PoC server and the controlling PoC server. The Real-Time Transport Protocol (RTP) communication protocol is usually used for the useful data communication links between the PoC client and the participating PoC server and between the participating PoC server and the controlling PoC server.

In the case of push-to-talk over cellular, participant communication terminals and their users may be simultaneously involved in a plurality of sessions. Since only one data stream can ever be output on the respective participant communication terminal at one time, a user of a participant communication terminal who has been invited to a communication session is able to determine, during a communication session, whether it is intended to be a high-priority communication session ("primary session") or a lower-priority communication session ("secondary session") for him.

The "primary session" priority can be assigned to precisely one communication session. The "secondary session" priority can be assigned to a plurality of other communication sessions. If data from a plurality of communication sessions thus arrive at a participant communication terminal at one time, the data from the communication session having the higher priority are output to the participant communication terminal, and the other data from the communication session(s) having a lower priority are discarded and are thus lost for the participant communication terminal.

According to one exemplary embodiment of the invention, fewer messages which are assessed as being of high priority by an entity that generates a conference session are discarded during a plurality or multiplicity of conference sessions that are simultaneously taking place.

One exemplary embodiment of the invention provides a method of computer-aided formation of a conference session invitation message, in which an identification indication identifying a conference session to which at least one participant communication terminal is to be invited is added to the conference session invitation message. In addition, a priority indication, which is used to prescribe at least one priority with which the conference session to which the at least one participant communication terminal is to be invited is to be conducted by the at least one participant communication terminal, is added to the conference session invitation message.

Another exemplary embodiment of the invention provides a method of computer-aided generation of a conference session, in which a conference session invitation message is formed by adding an identification indication identifying a conference to which at least one participant communication terminal is to be invited to the conference session invitation message and by adding a priority indication, which is used to prescribe at least one priority with which the conference session to which the at least one participant communication terminal is to be invited is to be conducted by the at least one participant communication terminal, to the conference session invitation message. The conference session invitation message is transmitted to the at least one participant communication terminal, and the conference session with the at least one participant communication terminal is generated in accordance with the priority indication.

Another exemplary embodiment of the invention provides a method of computer-aided processing of messages in a conference session, in which a conference session invitation message is received, the message having an identification indication identifying a conference session to which at least one participant communication terminal is to be invited and a priority indication which is used to prescribe at least one priority with which the conference session to which the at least one participant communication terminal is to be invited is to be conducted by the at least one participant communication terminal. The messages of the conference session are processed in accordance with priority indication.

One exemplary embodiment of the invention provides a unit generating a conference session invitation message, the unit adding an identification indication identifying a conference session to which at least one participant communication terminal is to be invited to the conference session invitation message. The unit generating a conference session invitation message also adds a priority indication, which is used to prescribe at least one priority with which the conference session to which the at least one participant communication terminal is to be invited is to be conducted by the at least one participant communication terminal, to the conference session invitation message.

One exemplary embodiment of the invention provides a unit generating a conference session, the unit having the above-described unit generating a conference session invitation message as well as a transmission unit transmitting the conference session invitation message to the at least one participant communication terminal. A conference session control unit providing the conference session with the at least one participant communication terminal in accordance with the priority indication is also provided.

Another exemplary embodiment of the invention provides a communication terminal having a terminal conference session control unit controlling a conference session at the terminal end. Provision is also made of a receiver receiving conference session messages and a determination unit determining a priority indication from a received conference session invitation message having an identification indication identifying a conference session to which the communication terminal has been invited and the priority indication which is used to prescribe at least one priority with which the conference session to which the communication terminal has been invited is to be conducted by the communication terminal. The terminal conference session control unit processes the message(s) during the conference session in accordance with the (respective) priority indication.

According to one exemplary embodiment of the invention, the priority to be used when receiving the messages in a conference is prescribed for the participant communication terminals which have been invited and thus for the participants who are to be invited to the conference; alternatively, a selection is prescribed, that is to say a set of a plurality of possible priorities, with which the conference in which a participant may possibly participate has to receive the messages, for example in the form of a minimum priority or in the form of a maximum priority. The priority with which the conference is to be conducted and thus, for example, whether a participant communication terminal has to set up a conference session as a "primary session" or as a "secondary session", for example, are thus already prescribed when inviting participants to a session-based communication conference.

This simply and reliably prevents messages containing data which have been assessed as being of high priority (i.e. having a high priority) by the communication terminal that is sending out invitations to the conference, for example the entire conference, in which high-priority data are interchanged in comparison with a conference which has been given a low priority by the entity, being discarded in the event of messages from a plurality of conferences colliding.

The participant generating a respective conference thus clearly enables very simple prioritization control during a conference. The participant communication terminal(s) invited can also decide in a very simple manner whether it/they is/are prepared to also accept the respective received invitation to the conference with the prescribed priority and thus to participate in the conference.

One exemplary embodiment of the invention provides a method of computer-aided formation of a conference session invitation message, the method having the following processes: an identification indication identifying a conference session to which at least one participant communication terminal is to be invited is added to the conference session invitation message, a priority indication, which is used to prescribe at least one priority with which the conference session to which the at least one participant communication terminal is to be invited is to be conducted, by the at least one participant communication terminal, with respect to other conference sessions that are simultaneously taking place, is added to the conference session invitation message.

The refinements of the invention described below relate not only to the above-described methods of computer-aided formation of a conference session invitation message, of generation of a conference session and of the processing of messages in a conference session but also to the unit generating a conference session invitation message, the unit generating a conference session and the communication terminal, where appropriate.

The priority indication may have a plurality of different priorities, for example a minimum priority which is used to indicate a minimum priority with which the conference session is to be conducted and/or a maximum priority which is used to indicate a maximum priority with which the conference session is to be conducted.

In other words, any desired set of discrete different priorities (in other words different priority values) may be contained in the priority indication, so that the participant who has been invited to the conference session may, if appropriate, select one priority from the plurality of prescribed priorities. Within the context of a prescribed set of priorities which is generally available, the priorities need not be a contiguous consecutive plurality of priorities but rather individual priorities may be selected and may be grouped to form a set or a plurality of sets which are transmitted as a priority indication. However, a minimum priority or a maximum priority may also be provided, which clearly represent a plurality of priorities from the generally available priorities as far as the minimum priority, or a plurality of priorities from the generally available priorities as far as the maximum priority.

Provision may thus be made for a multiplicity of priorities to be available overall for the conference, for example greater than or equal to three priorities, for example five or more priorities, which can be assigned to a respective conference in order to ensure that a respective conference which has been given a higher priority is given preferential treatment over a conference which has been given a lower priority, for example in order to ensure that, in the event of messages from conferences having different priorities colliding, the messages from the respective conference which has been given a higher priority are transmitted to the participant communication terminal and the messages from the respective conference which has been given a lower priority are suppressed or discarded.

The conference session invitation message can be received by the at least one participant communication terminal and, in the event of the invitation to the conference session being accepted by the at least one participant communication terminal, the conference can be conducted in the participant communication terminal in accordance with the priority indication.

Another refinement of the invention provides for the priority indication to have a plurality of different priorities and for the participant communication terminal to select one priority from the plurality of priorities and for the conference to then be conducted in the participant communication terminal in accordance with the priority selected.

In this manner, although the entity generating the conference ensures that only priorities which satisfy its requirements can generally be assigned to the conference, the participant who has been invited is still able to select (in a manner which is restricted anyway) priorities which the participant can then assign to the respective conference at the receiver end.

This clearly ensures, on the one hand, that the desired minimum requirements or maximum requirements as regards the conference can be prescribed by the participant who is generating the conference but a certain degree of flexibility nevertheless remains in the participant communication terminal that has been invited.

The conference session may be conducted as a half-duplex conference session, that is to say as a conference session in which only one participant or a plurality of participants (usually only the moderator of the conference, if appropriate) is/are respectively explicitly assigned a communication right and only those participants who have been provided with the respective communication right can introduce data into the conference and the respective participants who have not been provided with the communication right can merely receive the data which have been introduced into the communication session.

The conference session may be conducted in accordance with an IETF conference standard, for example in accordance with the IETF conferencing framework.

Alternatively, the conference session may be conducted in accordance with a push-to-talk communication protocol, for example in accordance with the Direct Connect communication service, as is offered by the company Nextel in the USA, or alternatively in accordance with any other desired push-to-talk communication protocol. The conference session may thus be conducted in accordance with a push-to-talk over cellular communication protocol, for example, as standardized by the Open Mobile Alliance and the 3rd Generation Partnership Project standardization committees, for example. Alternatively, the push-to-talk over cellular communication protocol may be used.

According to one refinement of the invention, the conference session invitation message is coded in accordance with the Session Initiation Protocol (SIP).

One aspect of the invention can clearly be seen in the signaling of minimum priorities or maximum priorities, for example, when sending out an invitation to a conference session, for example to a PoC session. Upon acceptance of the invitation, the priorities are likewise compulsorily adopted by the respective participant communication terminal accepting the invitation and are evaluated by the participant communication terminal. The priorities signaled in this manner are used to restrict the otherwise freely selectable priorities and are used to set the priorities for a participant or for his participant communication terminal in a more intelligent manner without indicated preferences.

Exemplary embodiments of the invention will be described below using the example of a push-to-talk over cellular communication system, it being necessary to point out that the invention can be implemented in any desired communication system in which a communication conference can be provided between a plurality of participants, for example a half-duplex communication conference.

In one alternative embodiment, the communication system is configured in accordance with the IETF (Internet Engineering Task Force) conferencing framework standard, for example. In a communication system other than that described in detail below, the communication protocols and message formats used are respectively adapted in an appropriate manner, the common general idea respectively being that, in a conference, the participant who is sending out an invitation to the conference, or his participant communication terminal, assigns at least one priority value to the conference (alternatively a plurality of priority values or a multiplicity of priority values), which priority value is transmitted, when sending out an invitation to the conference, to the respective telecommunication terminal which has been invited and which, upon acceptance of the invitation to the conference, processes the messages which are transmitted during the conference in accordance with the priority indicated using the priority value.

Push-to-talk over cellular (PoC) is a communication service which has been offered by Nextel to its customers for several years in the USA under the name "Direct Connect". In accordance with push-to-talk over cellular, a user or a transmitter communication terminal is able, after selecting the receivers and pressing a special PoC button, to transmit
   voice
   to a plurality of receivers at the same time
   in accordance with the half-duplex method.

During a PoC conference, the voice data are generally already distributed over the communication network (also referred to as streaming) and are thus transmitted to the other participants in the PoC conference while the user of the communication terminal that has been respectively assigned the communication right is speaking. From the point of view of the user, push-to-talk over cellular thus clearly resembles the classic CB radio but with the extension that the transmitter can address receivers all over the world which can be reached using the switching technology of at least one mobile radio communication network. The prerequisite in this case is that the respective receivers are currently registered in the respective mobile radio communication network, in other words are "online".

The architecture of a PoC communication system 100 according to one exemplary embodiment of the invention is illustrated in FIG. 1. In the case of push-to-talk over cellular, the packet-switched domain (PS domain) is used to transmit data, that is to say packet-switched data transmission is provided, the Internet Protocol (IP) and the Transport Control Protocol (TCP) being used, inter alia, as the network protocol. There is a central PoC server 101, which is arranged in the communication network 102, for each PoC group session (also referred to below as a PoC conference session), the respective central PoC server for a communication session also being referred to as a controlling PoC server.

In addition, the communication network also has, for each PoC client 103, 104, 105, a respective so-called participating PoC server 106, 107, 108 which is uniquely assigned to the PoC client 103, 104, 105, the PoC clients 103, 104, 105 respectively having, during a PoC conference session, a communication link to the controlling PoC server 101 via a participating PoC server 106, 107, 108 which is respectively allocated to them. Each PoC client 103, 104, 105 thus has a respective air interface 109, 110, 111 to the respective participating PoC server 106, 107, 108, each participating PoC server 106, 107, 108 respectively having an interface and thus a communication link 112, 113, 114 to the controlling PoC server 101. The controlling PoC server 101 additionally also has a location server interface 115 to a location server 116, a group management interface 117 to a group management server 118 and a presence interface 119 to a presence server 120. In addition, the group management server 118 also has an interface 121 to the location server 116 and a further interface 122 to the presence server 120.

In alternative refinements of the invention, servers for possibly additionally desired communication services are also provided in addition to the location server 116, the group management server 118 and the presence server 120.

Each PoC client 103, 104, 105 is implemented in a respective mobile radio communication terminal (not illustrated in FIG. 1), for example a mobile radio telephone or any other desired mobile radio communication terminal, for example integrated in a notebook or alternatively in a personal digital assistant (PDA), a personal computer etc.

The respective air interface 109, 110, 111 between the PoC client 103, 104, 105 and the respective participating PoC server 106, 107, 108 can be implemented, for example when using a UMTS communication system as the mobile radio communication network, using the Radio Access Network (RAN), the Core Network (CN) and the IP Multimedia Subsystem (IMS). Other implementations, for example using a conventional landline communication network (PSTN), are provided in alternative embodiments of the invention. Alternatively, provision may also be made of any other desired mobile radio communication system in which a push-to-talk communication service is implemented, for example using IMS. GPRS (General Packet Radio Service), for example, can thus alternatively be used as the mobile radio network or alternatively, for example, the CDMA2000 communication system which has already been provided in the USA and uses, for the purpose of signaling, the so-called MMD (Mobile Media Distribution) communication protocol in order to provide a communication conference.

As described above, the IMS, in accordance with which the Session Initiation Protocol (SIP) is used as the signaling protocol, is used, for example, for the signaling communication link between the respective PoC client 103, 104, 105 and the respective participating PoC server 106, 107, 108 and between the respective participating PoC server 106, 107, 108 and the controlling PoC server 101. The RTP protocol is used for the data communication link, that is to say for the communication link in which the useful data are transmitted during the respective PoC conference, between the respective PoC client 103, 104, 105 and the participating PoC server 106, 107, 108 and between the participating PoC server 106, 107, 108 and the controlling PoC server 101.

FIG. 2 shows, in a simplified form, a block diagram 200 of the communication protocol stack which is provided in accordance with push-to-talk over cellular.

Provided on the physical protocol level is, for example, a modulator/demodulator (modem) 201 which is coupled to a plurality of protocol stacks, which are contained, for example, in a unit for coding and decoding data in accordance with the Session Initiation Protocol and/or in a unit for coding and decoding data in accordance with the Hypertext Transfer Protocol (HTTP) (symbolized in FIG. 2 using block 203), by means of a bidirectional interface 202. The communication unit which, in accordance with a communication model, is situated on the uppermost level of the protocol stack 203 is connected, by means of bidirectional interfaces 204, 205, to a respective PoC client 206 and to a group management/presence client 207, which, for their part, are connected, by means of a respective bidirectional interface 208 and 209, to a PoC application unit 210 that implements a PoC application. The PoC client 206 is also connected for the purpose of communication, by means of a bidirectional interface 211, to a user interface 212 which, for its part, is connected to the group management/presence client 207 by means of a further bidirectional communication link 213.

In the case of push-to-talk over cellular, participants and/or their participant communication terminals may be simultaneously involved in a plurality of communication sessions, one alternative embodiment of the invention being able to provide for the communication sessions in which a communication terminal is involved to be of different types; a communication terminal may thus be involved, for example, in a push-to-talk over cellular communication session and additionally in a communication session in accordance with the IETF conferencing framework.

Since only one data stream can usually be output on the respective communication terminal at one time in a communication session, provision is made for a participant who is generating a conference session to assign a priority to the conference session. If data simultaneously arrive in a plurality of conference sessions, the data from the conference session having the highest priority are output on the respective communication terminal.

One embodiment of the invention provides two priorities, namely a high priority, which is used to declare a conference session as being a "primary session", and a lower priority, which is used to declare a conference session as being a "secondary session". According to this embodiment of the invention, the "primary session" priority can be assigned to precisely one conference session and the "secondary session" priority can be assigned to a plurality of conference sessions, if appropriate.

One alternative refinement of the invention provides for further priorities to be added to the PoC communication standard; for example, the priorities from 1 to 5 (that is to say priorities 1, 2, 3, 4, 5) could thus be introduced, the priority 1 being used to denote the highest priority and the priority 5 being used to denote the lowest priority of a respective conference session. Since the priorities of a conference session can be selected by each participant or by each participant communication terminal to be different to those selected by the other participants in the same conference session, it may be the case, according to the prior art, that a conference session has been allocated a very high priority by one participant and has been allocated a very low priority by another participant. This results in the fact that a data stream is occasionally not output to a participant who has selected a low priority, while the other participants or the other communication terminals in the same conference session receive the data stream and have it displayed.

If a PoC user invites other participants to a particular conference session which is generated by the user, it is conceivable that the user would like to ensure that all participants in the conference session do not give the latter a lower priority than a prescribed minimum priority. The importance of a conference session is thus likewise signaled. Participants would be invited to participate in an important communication with a high minimum priority. Participants would be invited to participate in a communication used for entertainment without a minimum priority. As explained in even more detail below, it would be possible, for example, if appropriate, to indicate a maximum priority which is used by a participant who is sending out an invitation to ensure that an invited participant does not give the respective conference session a higher classification than an important communication.

In push-to-talk over cellular, there are generally two different possibilities of how a push-to-talk over cellular user can become a PoC participant in a PoC group of a conference session. He can himself access an existing PoC conference session or accepts an invitation to a conference session.

FIG. 3 uses a message flowchart 300 to show a method according to one exemplary embodiment of the invention, in which a first PoC client 103, implemented in a first mobile radio communication terminal 301, sends out an invitation to a PoC conference to be generated. In order to start the PoC session (also referred to below as a PoC conference session), the initiator, that is to say the first mobile radio communication terminal 301, generates and sends a first SIP INVITE message 302 which is used to generate the PoC conference session to be initiated and indicates or contains, in addition to the respective conference identification indication (session ID), those participants which are to be invited to the PoC conference session.

According to this embodiment of the invention, the additional prioritization is concomitantly inserted into the first SIP INVITE message 302 in a message field which is specifically provided for this purpose or alternatively in a useful data field area of the SIP INVITE message 302. For the purpose of simpler description, only the "primary session" priority will be used below and assigned to the conference session, for example with the aid of an extension (provided in this embodiment of the invention) of the private header pop-up area. The first SIP INVITE message 302 then has the following exemplary structure:

INVITE sip:bob@Biloxi.com SIP/2.0
Via: SIP/2.0/UDP pc33.atlanta.com; branch=z9hG4bKnashds8
Max-Forwards: 70
To: Bob <sip:bob@biloxi.com>
From: Alice <sip.alice@atlanta.com>; tag=1928301774
Call-ID: a84b4c76e66710
Cseq: 314159 INVITE
Contact: <sip:alice@pc33.atlanta.com
Content-Type: application/sdp
Content-Length: 142
tb_priority: 2
c=IN IP6 5555::aaa:bbb:ccc:ddd
a=forced_session_prio primary
m=audio 3456 RTP/AVP 97
a=rtpmap:97 AMR
a=rtcp:5560
m=applicaion 2000 udp TBCP
a=fmtp:TBCP queuing=1; timestamp=1

Provision is alternatively made for the priority to be completely inserted into the SDP part (Session Description Protocol).

The following table indicates, by way of example, one possible format according to one exemplary embodiment of the invention:

INVITE sip:bob@Biloxi.com SIP/2.0
Via: SIP/2.0/UDP pc33.atlanta.com; branch=z9hG4bKnashds8
Max-Forwards: 70
To: Bob <sip:bob@biloxi.com>
From: Alice <sip.alice@atlanta.com>; tag=1928301774
Call-ID: a84b4c76e66710
Cseq: 314159 INVITE
Contact: <sip:alice@pc33.atlanta.com
Content-Type: application/sdp
Content-Length: 142
c=IN IP6 5555::aaa:bbb:ccc:ddd
a=forced_session_prio primary
m=audio 3456 RTP/AVP 97
a=rtpmap:97 AMR
a=rtcp:5560
m=applicaion 2000 udp TBCP
a=fmtp:TBCP queuing=1; tb_priority=2; timestamp=1

The first SIP INVITE message 302 is transmitted to the IMS core network 303 which, for its part, generates a second SIP INVITE message 304 and transmits it to the controlling PoC server 101. Provision is alternatively made for the IMS core network 303 to forward the first SIP INVITE message 302 to the PoC server 101 unchanged.

After the first SIP INVITE message 302 has been received, the IMS core network 303 also generates an SIP 100 Trying message 307 which the IMS core network transmits to the first mobile radio communication terminal 301 and uses to inform the latter that the IMS core network 303 is now attempting to set up the desired PoC conference session.

As is known per se from the prior art, the PoC server 101 then uses the first SIP INVITE message 302 to set up the PoC conference session with the participant(s) indicated in the second SIP INVITE message 304.

In this context, it should be pointed out that the second SIP INVITE message 304 also contains the priority indication. The corresponding SIP INVITE messages are then generated by the PoC server 101 and transmitted to the participant communication terminals to be invited (not illustrated), the respective SIP INVITE messages which are transmitted to the participant communication terminals that are invited to the conference session also concomitantly containing the priority prescribed in the first SIP INVITE message 302.

The respective invited participant communication terminal(s) or its/their PoC clients 104, 105 is/are thus informed of the desired minimum priority or maximum priority of the conference session which the respective participant communication terminal has to ensure when it accepts the invitation to the conference session. If the invitation to the conference session is accepted by one or more or all of the invited PoC participant communication terminals, the PoC server 101 generates the conference session and uses a first SIP result message (SIP Final Response) 305 to transmit the information regarding the successful generation of the PoC conference session to the IMS core network 303 which, for its part, processes the first SIP result message 305 and uses it to generate a second SIP result message (SIP Final Response) 306 which the IMS core network 303 transmits to the mobile radio communication terminal 301 which initiates the PoC conference session.

After the second SIP result message 306 has been received, the first mobile radio communication terminal 301 generates an SIP acknowledgement message 308 and sends it to the IMS core network 303 which, for its part, generates a second SIP acknowledgement message 309 and transmits it to the PoC server 101 which, in response to the receipt of the second SIP acknowledgement message 309, informs the further communication terminals of the successful set-up of the PoC conference session and has thus set up the desired PoC conference session.

The PoC conference session now takes place, each communication terminal participating in the PoC conference session conducting the conference session with the priority indicated in the first SIP INVITE message.

The procedure described above is explained in more detail below with reference to a clear application scenario.

It is assumed that a taxi company uses a PoC conference session for communication between the taxi drivers and for communication between a respective driver and the taxi control center. If the taxi drivers are also participating in other PoC conference sessions, the latter should be received with a lower priority, with a priority of a "secondary session" of another conference session. For this reason, the taxi control center or its PoC client sends out an invitation to each taxi driver or the PoC clients of the communication terminals of the taxi drivers with the highest priority as the minimum priority for the respective PoC conference session.

A private conversation between three taxi drivers which is set up in addition to the central communication session is used purely for entertainment. For this reason, a first participant invites two further participants, that is to say a second participant taxi driver and a third participant taxi driver, to participate in a further PoC conference session. The first participant taxi driver or its PoC client signals the priority of the communication session to the participant taxi drivers in the invitation, that is to say in the respective SIP INVITE message, using a maximum priority which is lower than the priority of the above-described conference session of the taxi control center. In this case, the PoC conference session would be received with a low priority even without manual adjustments by the second participant taxi driver or by the third participant taxi driver. This signaling is likewise used to signal, to the receiving participants, the importance or unimportance of the PoC conference session to which they are currently being invited.

In this context, it should be pointed out that the priority indicated in the SIP INVITE message cannot be changed by the communication terminals receiving the invitation or their PoC clients.

In summary, one aspect of the invention can be seen in the fact that, when sending out an invitation to a conference session, for example a PoC conference session, the initiator of the conference session can signal a minimum priority or a maximum priority. If a participant accepts the invitation to a conference session, he cannot give the latter a lower priority than the minimum priority signaled in the invitation or cannot give it a higher priority than the maximum priority signaled in the invitation.

Advantages of this procedure are, for example:

(1) using the minimum priority indicated to already signal the importance of a session when sending out the invitation;

(2) ensuring that the importance of a conference session is not underestimated by some participants;

(3) the ability to send out invitations to a session which does not hinder other communications or communication sessions by virtue of the fact that the invitation is sent out with a lower maximum priority; and (4) in the event that the participant himself does not allocate any priorities, adopting the minimum priority or maximum priority is more sensible than a standard value which gives all conference sessions equal priority.

The invention claimed is:

1. A method of computer-aided formation of a conference session invitation message, the method comprising:
adding an identification indication, which identifies a conference session to which at least one participant communication terminal is to be invited, to the conference session invitation message; and
adding a priority indication, which prescribes a plurality of different priority values with which the conference session is to be conducted with respect to other conference sessions that are simultaneously taking place, to the conference session invitation message.

2. The method as claimed in claim 1, wherein the priority indication comprises:
a minimum priority value which indicates a minimum priority with which the conference session is to be conducted with respect to other conference sessions that are simultaneously taking place, or
a maximum priority value which indicates a maximum priority with which the conference session is to be conducted with respect to other conference sessions that are simultaneously taking place.

3. The method as claimed in claim 1, wherein the conference session is conducted as a half-duplex conference session.

4. The method as claimed in claim 1, wherein the conference session is conducted in accordance with an IETF conference communication standard.

5. The method as claimed in claim 1, wherein the conference session is conducted in accordance with a push-to-talk communication protocol.

6. The method as claimed in claim 5, wherein the conference session is conducted in accordance with a push-to-talk over cellular communication protocol.

7. The method as claimed in claim 1, wherein the conference session invitation message is coded in accordance with the Session Initiation Protocol.

8. A method of computer-aided generation of a conference session, the method comprising:
forming a conference session invitation message by:
adding an identification indication, which identifies a conference session to which at least one participant communication terminal is to be invited, to the conference session invitation message; and
adding a priority indication, which prescribes a plurality of different priority values with which the conference session is to be conducted with respect to other conference sessions that are simultaneously taking place, to the conference session invitation message;
transmitting the conference session invitation message to the at least one participant communication terminal; and
generating the conference session with the at least one participant communication terminal in accordance with the priority indication.

9. The method as claimed in claim 8, wherein the priority indication comprises:
a minimum priority value which indicates a minimum priority with which the conference session is to be conducted with respect to other conference sessions that are simultaneously taking place, or
a maximum priority value which indicates a maximum priority with which the conference session is to be conducted with respect to other conference sessions that are simultaneously taking place.

10. The method as claimed in claim 8, further comprising:
receiving the conference session invitation message by the at least one participant communication terminal; and
if the invitation to the conference session is accepted by the at least one participant communication terminal, conducting the conference in the participant communication terminal in accordance with the priority indication.

11. The method as claimed in claim 10, further comprising:
the participant communication terminal selecting one priority value from the plurality of priority values; and
conducting the conference in the participant communication terminal in accordance with the priority value selected.

12. The method as claimed in claim 8, wherein the conference session is conducted as a half-duplex conference session.

13. The method as claimed in claim 8, wherein the conference session is conducted in accordance with an IETF conference communication standard.

14. The method as claimed in claim 8, wherein the conference session is conducted in accordance with a push-to-talk communication protocol.

15. The method as claimed in claim 14, wherein the conference session is conducted in accordance with a push-to-talk over cellular communication protocol.

16. The method as claimed in claim 8, wherein the conference session invitation message is coded in accordance with the Session Initiation Protocol.

17. A method of computer-aided processing of messages in a conference session, the method comprising:
receiving a conference session invitation message having an identification indication identifying a conference session to which at least one participant communication terminal is to be invited and a priority indication which is used to prescribe a plurality of different priority values with which the conference session is to be conducted with respect to other conference sessions that are simultaneously taking place; and
processing messages of the conference session in accordance with the priority indication.

18. The method as claimed in claim 17, wherein the priority indication comprises:
a minimum priority value which indicates a minimum priority with which the conference session is to be conducted with respect to other conference sessions that are simultaneously taking place, or
a maximum priority value which indicates a maximum priority with which the conference session is to be conducted with respect to other conference sessions that are simultaneously taking place.

19. The method as claimed in claim 17, wherein the conference session is conducted as a half-duplex conference session.

20. The method as claimed in claim 17, wherein the conference session is conducted in accordance with an IETF conference communication standard.

21. The method as claimed in claim 17, wherein the conference session is conducted in accordance with a push-to-talk communication protocol.

22. The method as claimed in claim 21, wherein the conference session is conducted in accordance with a push-to-talk over cellular communication protocol.

23. The method as claimed in claim 17, wherein the conference session invitation message is coded in accordance with the Session Initiation Protocol.

24. A unit generating a conference session invitation message, wherein the unit
adds an identification indication, which identifies a conference session to which at least one participant communication terminal is to be invited, to the conference session invitation message, and
adds a priority indication, which is used to prescribe a plurality of different priority values with which the conference session is to be conducted with respect to other conference sessions that are simultaneously taking place, to the conference session invitation message.

25. A unit generating a conference session, the unit comprising:
a unit generating a conference session invitation message, which
adds an identification indication, which identifies a conference session to which at least one participant communication terminal is to be invited, to the conference session invitation message; and
adds a priority indication, which is used to prescribe a plurality of different priority values with which the conference session to be conducted with respect to other conference sessions that are simultaneously taking place, to the conference session invitation message;
a transmission unit which transmits the conference session invitation message to the at least one participant communication terminal; and
a conference session control unit which provides the conference session with the at least one participant communication terminal in accordance with the priority indication.

26. A communication terminal, comprising:
a terminal conference session control unit controlling a conference session at the terminal end;
a receiver receiving conference session messages; and
a determination unit determining a priority indication from a received conference session invitation message having an identification indication identifying a conference session to which the communication terminal has been invited and the priority indication which prescribes a plurality of different priority values with which the conference session is to be conducted with respect to other conference sessions that are simultaneously taking place,
wherein the terminal conference session control unit processes messages during the conference session in accordance with the priority indication.

27. A unit generating a conference session, the unit comprising:
a means for generating a conference session invitation message, which
adds an identification indication, which identifies a conference session to which at least one participant communication terminal is to be invited, to the conference session invitation message; and
adds a priority indication, which is used to prescribe a plurality of different priority values with which the conference session to be conducted with respect to other conference sessions that are simultaneously taking place, to the conference session invitation message;
a transmission means for transmitting the conference session invitation message to the at least one participant communication terminal; and
a conference session control means for providing the conference session with the at least one participant communication terminal in accordance with the priority indication.

28. A communication terminal, comprising:
a terminal conference session control means for controlling a conference session at the terminal end;
a receiver for receiving conference session messages; and
a determination means for determining a priority indication from a received conference session invitation message having an identification indication identifying a conference session to which the communication terminal has been invited and the priority indication which prescribes a plurality of different priority values with which the conference session is to be conducted with respect to other conference sessions that are simultaneously taking place,
wherein the terminal conference session control means processes messages during the conference session in accordance with the priority indication.

* * * * *